US010417169B1

(12) United States Patent
Leong et al.

(10) Patent No.: US 10,417,169 B1
(45) Date of Patent: *Sep. 17, 2019

(54) METHODS AND APPARATUS FOR HIGH-SPEED SERIAL INTERFACE LINK ASSIST

(71) Applicant: ALTERA CORPORATION, San Jose, CA (US)

(72) Inventors: Han Hua Leong, Butterworth (MY); Suresh Gordhanlal Andani, Fremont, CA (US); Peter Schepers, Bornem (BE)

(73) Assignee: Altera Corporation, San Jose, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/264,293

(22) Filed: Sep. 13, 2016

Related U.S. Application Data

(63) Continuation of application No. 14/982,664, filed on Dec. 29, 2015, now Pat. No. 9,465,769.

(51) Int. Cl.

| G06F 11/00 | (2006.01) |
|---|---|
| G06F 13/00 | (2006.01) |
| G06F 13/42 | (2006.01) |
| G06F 13/10 | (2006.01) |
| G06F 13/20 | (2006.01) |
| G06F 11/07 | (2006.01) |

(52) U.S. Cl.
CPC ........ *G06F 13/4286* (2013.01); *G06F 11/076* (2013.01); *G06F 11/0745* (2013.01); *G06F 11/0793* (2013.01); *G06F 13/102* (2013.01); *G06F 13/20* (2013.01)

(58) Field of Classification Search
CPC .... G06F 13/20; G06F 13/102; G06F 13/4286; G06F 11/267; G06F 11/2289; G06F 11/076; G06F 11/0793; G06F 11/0745
USPC ........ 714/704, 746, 748, 749, 750; 709/203, 709/208, 209, 211, 237
See application file for complete search history.

(56) References Cited

U.S. PATENT DOCUMENTS

| 5,838,749 | A | 11/1998 | Casper et al. |
|---|---|---|---|
| 6,914,637 | B1 | 7/2005 | Wolf et al. |
| 7,277,031 | B1 | 10/2007 | Lo et al. |
| 7,728,625 | B1 | 6/2010 | Nechamkin et al. |
| 7,916,633 | B2 * | 3/2011 | McGregor ............ H04L 12/403 370/230 |
| 9,052,900 | B2 | 6/2015 | Zhang et al. |
| 9,100,094 | B2 | 8/2015 | Tell et al. |
| 2002/0066059 | A1 | 5/2002 | Hara et al. |

(Continued)

*Primary Examiner* — Christine T. Tu

(57) ABSTRACT

The present disclosure provides a link assist capability that may be added to a compiled design that includes a transceiver. The transceiver with the link assist capability may be dynamically reconfigured to operate in a link assist mode, which is a diagnostic and test mode. The link assist mode may interact with a HSSI link partner, or a design software tool, or a user-defined program. The link assist mode may also facilitate remote debugging. One embodiment relates to an apparatus for serial interface link assist. Another embodiment relates to a method of dynamic reconfiguration of transceiver settings. Another embodiment relates to a method of tuning a bidirectional serial link. Other features, aspects and embodiments are also disclosed.

15 Claims, 8 Drawing Sheets

300

(56) References Cited

U.S. PATENT DOCUMENTS

| | | | |
|---|---|---|---|
| 2009/0100143 A1* | 4/2009 | Nakayama | H04L 12/423 |
| | | | 709/208 |
| 2012/0297233 A1 | 11/2012 | Ross | |
| 2013/0067016 A1* | 3/2013 | Adkins | H04L 9/0866 |
| | | | 709/208 |
| 2013/0170579 A1 | 7/2013 | Nishioka | |
| 2015/0188696 A1 | 7/2015 | Huang et al. | |

* cited by examiner

FIG. 4    400

METHODS AND APPARATUS FOR HIGH-SPEED SERIAL INTERFACE LINK ASSIST

CROSS-REFERENCE TO RELATED APPLICATION(S)

The present application is a continuation of U.S. patent application Ser. No. 14/982,664, filed Dec. 29, 2015, the disclosure of which is hereby incorporated by reference.

BACKGROUND

Technical Field

The present disclosure relates generally to electronic interfaces. More particularly, the present disclosure relates to high-speed serial interfaces.

Description of the Background Art

High-speed serial interface (HSSI) links may be used to communicate data between devices in a system. Such HSSI links may provide a high data bandwidth across backplanes or between chip devices.

HSSI links are conventionally tuned in a manual manner. For example, the Transceiver Toolkit available from Altera Corporation of San Jose, Calif. may be used to perform manual tuning and reporting for analyzing a HSSI link. The manual tuning is often performed on evaluation samples of the devices, which may differ from production volumes of the devices. Hence, the manual tuning may be inaccurate when applied to production devices integrated into a system.

SUMMARY

The present disclosure provides a link assist capability that may be added to a compiled design that includes a transceiver. The transceiver with the link assist capability may be dynamically reconfigured to operate in a link assist mode, which is a diagnostic and test mode. The link assist mode may interact with a HSSI link partner, or a design software tool, or a user-defined program. The link assist mode may also facilitate remote debugging.

One embodiment relates to an apparatus for serial interface link assist. A PCS encoder encodes an outgoing data signal to generate a first encoded outgoing data signal, and a link assist engine receives an encoded incoming data signal and outputs a second encoded outgoing data signal. A multiplexor selector selects one of the first and second encoded outgoing data signals and outputs the selected encoded outgoing signal for transmission by a transmitter to an outbound serial data channel.

Another embodiment relates to a method of dynamic reconfiguration of transceiver settings. A dynamic reconfiguration event is triggered for a target transceiver that includes a link assist controller. Handshaking is performed between a master controller of a partner transceiver and the link assist controller of the target transceiver to cause the target transceiver to enter a link assist mode as a slave to the master controller. Commands are sent from the master controller to the link assist controller to reconfigure the transceiver settings of the target transceiver.

Another embodiment relates to a method of tuning a bidirectional serial link between a target transceiver in a target device and a partner transceiver in a partner device. Handshaking is performed between a master controller of the partner transceiver and a link assist controller of the target transceiver to cause the target transceiver to enter a link assist mode as a slave to the master controller. The tuning may include separately testing both directions of the link and also testing a round-trip path over the link.

Other features, aspects and embodiments are also disclosed.

DETAILED DESCRIPTION

A majority of the time spent in the transceiver application bringing up a customer system is to establish the optimum settings in the transceiver to reliably operate. When the setup being used does not meet the bit error rate target, identifying the issue may be complicated and time consuming, particularly if there are no adequate run-time isolation and debug capabilities. In these cases, issue identification and debug may require switching the customer design to a transceiver toolkit design or other reference design.

The present disclosure provides a link assist capability that may be added to a compiled design that includes a transceiver. The transceiver with the link assist capability may be dynamically reconfigured to operate in a link assist mode, which is a diagnostic and test mode. The link assist mode may interact with a HSSI link partner, or a design software tool (such as the QUARTUS software tool, available from Altera Corporation of San Jose, Calif.), or a user-defined program. The link assist mode may also facilitate remote debugging.

The present disclosure provides a link assist mode that assists in HSSI link diagnosis, tuning and verification. The HSSI link may be dynamically reconfigurable to a link assist mode, and the link assist mode may be utilized to isolate HSSI and/or physical medium related issues without switching the existing internal or customer design to a reference design.

The link assist mode provides run-time debug capabilities. These capabilities may include: mistake-proof step-by-step guidance and test options; adaptive tuning of the PMA/PLL settings for power and signal integrity; and optimization of device settings over board/backplane fabrication tolerance and PVT variations.

Figure 1:
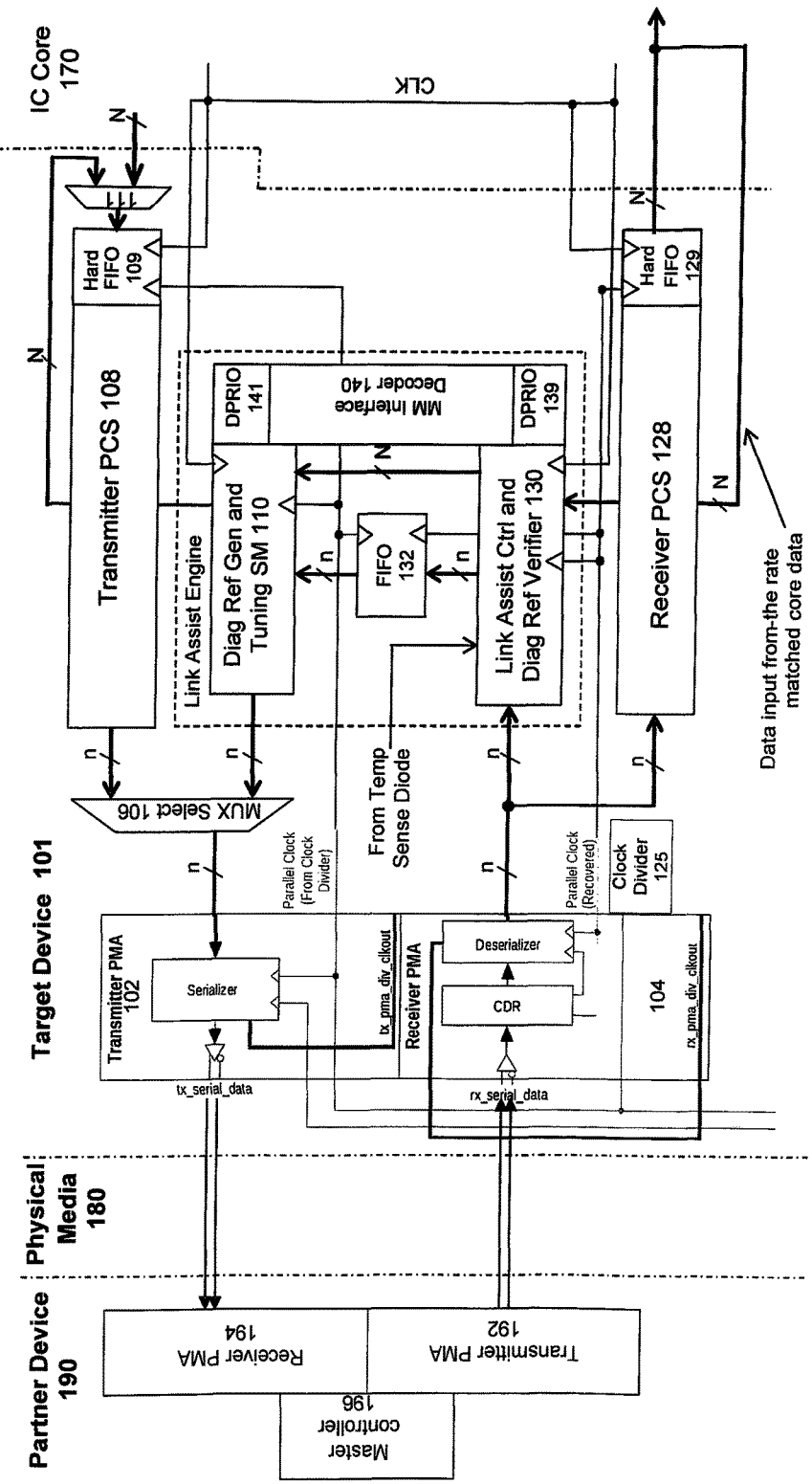
FIG. 1 depicts an apparatus including a HSSI link assist in accordance with an embodiment of the invention.

FIG. 1 depicts an apparatus 100 including a HSSI link assist in accordance with an embodiment of the invention. Depicted in the figure is a target integrated circuit (IC) device (Target Device) 101 that communicates via physical media 180 with a partner IC device (Partner Device) 190. In one embodiment, the Target Device 101 is a field programmable gate array (FPGA), in which case the IC Core 170 is an FPGA Fabric.

Transmitter physical media attachment (PMA) circuitry 102 and Receiver PMA circuitry 104 are shown in the Target Device 101. The Transmitter PMA 102 transmits serial data via an outbound serial data channel to a Receiver PMA 194 on the Partner Device 190, and the Receiver PMA 104 receives serial data via an inbound serial data channel from a Transmitter PMA 192 on the Partner Device 190.

As shown, the Transmitter PMA 102 includes a serializer circuit that serializes an n-bit parallel data signal to a serial data signal (tx_serial_data). The Receiver PMA 104 includes a clock data recover (CDR) circuit and a deserializer. The CDR recovers the parallel clock signal and a serial data signal. The deserializer converts the serial data signal (rx_data_signal) to an n-bit wide (parallel) data signal.

As depicted, the n-bit wide data signal from the deserializer of the Receiver PMA 104 is output to both the ReceiverPhysical Coding Sublayer (PCS) circuitry 128 and the link assist controller and diagnostic reference verifier (Link Assist Ctrl and Diag Ref Verifier) module 130.

The Receiver PCS (PCS decoder) 128 may output an N-bit data signal via a hard-wired first-in-first-out (Hard FIFO) buffer 129. In this embodiment, the Hard FIFO 129 operates as a rate-match FIFO that receives as clock inputs the parallel clock recovered by the CDR in the Receiver PMA 104 and a system clock (CLK) signal from the IC Core 170. The N-bit rate-matched data signal may be output from the Hard FIFO 129 to the IC Core 170, and the N-bit rate-matched core data signal may be provided as an N-bit wide data input to the Link Assist Ctrl and Diag Ref Verifier module 130.

In one exemplary implementation, when 8b/10b encoding is used, the n-bit data path is 10 bits wide, and the N-bit wide data path is 8 bits wide. In another exemplary implementation, when 64b/66b encoding is used, the n-bit data path is 66 bits wide, and the N-bit wide data path is 64 bits wide. Alternatively, other encoding schemes may be utilized.

As further depicted, the n-bit wide data signal input to the serializer of the transmitter PMA 102 is received from a multiplexer (MUX) select circuit 106. The MUX select 106 controllably selects an n-bit wide data signal either from a transmitter physical coding sublayer (PCS) circuit 108, or a diagnostic reference generator and tuning state machine (Diag Ref Gen and Tuning SM) 110.

The Transmitter PCS (PCS encoder) 108 may receive an N-bit wide data signal via a Hard FIFO buffer 109. The Hard FIFO 109 operates as a rate-match FIFO that receives the N-bit wide data signal from an input selector 111 and a corresponding system clock (CLK) signal from the IC Core 170 and provides the N-bit wide data signal to the Transmitter PCS 108 using the parallel clock from the clock divider 125. The selector 111 controllably selects either an N-bit wide data signal from the IC Core 170 or an N-bit wide data signal from the Diag Ref Gen and Tuning SM module 110. The selected N-bit wide data signal is output to the Hard FIFO 109.

The Link Assist Engine includes components that provide the link assist capabilities. These components include the Diag Ref Gen and Tuning SM module 110, the Link Assist Ctrl and Diag Ref Verifier module 130, a bridging FIFO 132, a memory-mapped (MM) decoder 140, and dynamic partial reconfigurable input/output (DPRIO) blocks 139 and 141.

The Link Assist Ctrl and Diag Ref Verifier module 130 receives the n-bit wide data signal from the deserializer in the receiver PMA 104 and a corresponding clock signal that is the parallel clock recovered by the CDR in the Receiver PMA 104. The Link Assist Ctrl and Diag Ref Verifier module 130 also receives a N-bit wide data signal from the IC Core 170 and a corresponding clock signal that is the CLK signal from the IC Core 170. An n-bit wide data signal is output from the Link Assist Ctrl and Diag Ref Verifier module 130 to the bridging FIFO 132, and an N-bit wide data signal is output from the Link Assist Ctrl and Diag Ref Verifier module 130 directly to the Diag Ref Gen and Tuning SM module 110.

As shown, the Link Assist Ctrl and Diag Ref Verifier module 130 may also receive an input from a temperature sensing diode (Temp Sense Diode). This input may be used for adaptive tuning with respect to temperature.

The bridging FIFO 132 receives an n-bit wide data signal from the Link Assist Ctrl and Diag Ref Verifier module 130 and a corresponding clock input that is the recovered parallel clock from the CDR. The bridging FIFO 132 outputs an n-bit wide data signal to the Diag Ref Gen and Tuning SM module 110, which is timed using the parallel clock from the clock divider.

The MM interface decoder 140 and two DPRIO blocks (139 and 141) are also provided. The MM interface decoder 140 may be used to access and perform read, write or read-modify-write operations to any HSSI DPRIO and soft control and status register (CSR) within the target IC 101. One DPRIO 139 is provided for link assist controller, and the other DPRIO 141 is provided for the tuning state machine.

The Diag Ref Gen and Tuning SM module 110 receives the n-bit wide data signal from the bridging FIFO 132 and a corresponding clock signal that is the parallel clock recovered by the CDR in the Receiver PMA 104. The Diag. Ref Gen and Tuning SM module 110 also receives a N-bit wide data signal from the Link Assist Ctrl and Diag Ref Verifier module 130 and a corresponding clock signal that is the CLK signal from the IC Core 170. An n-bit wide data signal is output from the Diag Ref Gen and Tuning SM module 110 to the MUX Select 106, and an N-bit wide data signal is output from the Diag Ref Gen and Tuning SM module 110 to the input selector 111.

Also depicted is a master controller 196 in the partner device. In one embodiment, the partner transceiver includes a link assist engine such that the master controller 196 is a link assist controller. In another embodiment, the partner transceiver does not include a link assist engine, and the master controller 196 is implemented in a software stack in the partner device.

Figure 2:
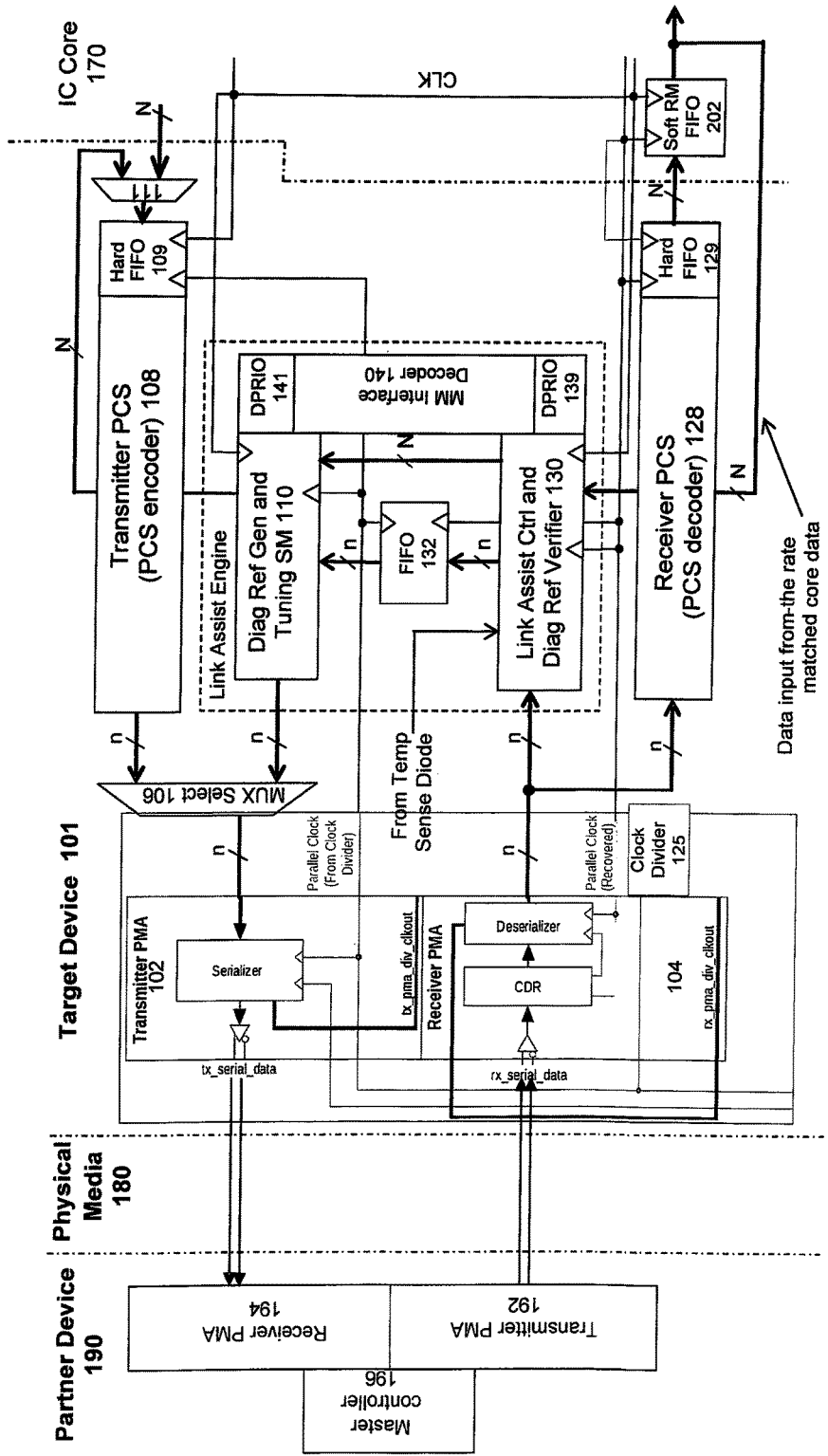
FIG. 2 depicts an apparatus including a HSSI link assist in accordance with another embodiment of the invention.

FIG. 2 depicts an apparatus 200 including a HSSI link assist in accordance with another embodiment of the invention. The apparatus 200 in FIG. 2 uses a soft (i.e. electronically configurable) rate-match (Soft RM) FIFO buffer 202, instead of a hard-wired rate-match FIFO, in the receiver path.

In this apparatus 200, the Hard FIFO 129 receives the recovered parallel clock at both its clock inputs, while Soft RM FIFO 202 receives the recovered parallel clock at one clock input and the system clock (CLK) signal from the IC Core 170 at its other clock input. Hence, Soft RM FIFO 202 operates as the rate-match FIFO instead of the Hard FIFO 129. The Soft RM FIFO 202 receives the N-bit wide data signal from the Hard FIFO 129 and outputs the rate-matched N-bit wide data signal to the IC Core 170 and also to the Link Assist Ctrl and Diag Ref Verifier module 130.

The apparatus described above in FIGS. 1 and 2 provide the infrastructure to be able to enter a Link Assist mode from a design with a legacy datapath with or without 8G/10G PCS. The Link Assist Engine provides HSSI link diagnostic, tuning and verification functions.

The Link Assist Engine includes a diagnostic reference generator (in Diag Ref Gen and Tuning SM module 110) and a diagnostic reference verifier (in Link Assist Ctrl and Diag Ref Verifier module 130). These components are utilized for handshaking, auto-negotiations or test patterns running at relatively low speed. These components are also used for bit error rate (BER) testing with programmable patterns running at a targeted data rate.

The Link Assist Engine also includes a link assist controller (in Link Assist Ctrl and Diag Ref Verifier module 130) and an associated DPRIO 139 and a tuning state machine (in Diag Ref Gen and Tuning SM module 110) and an associated DPRIO 141. These components are utilized for command-base sequential control in different configurations. These components are also used for dynamical reconfiguration and status reporting via a link partner. The dynamical reconfiguration and status reporting is compatible with PHY IP embedded debug—adding a low-cost version to access the embedded debug network without needing JTAG. In addition, these components may be used for an adaptive tuning capability with respect to temperature.

The MM interface decoder 140 may be utilized to provide dynamic reconfiguration via the HSSI link partner. In particular, the MM interface decoder 140 may provide read, write, or read-modify-write access to any HSSI DPRIO (139 and 141) and to soft configuration and status registers (soft CSRs) within the target device 101.

The Link Assist Engine provides, among other features, two reverse parallel loopback paths. These reverse parallel loopback paths advantageously limit (isolate) losses to the physical medium to one direction (i.e. from the Partner Device to the Target Device, or vice versa) when doing BER testing.

A first reverse parallel loopback path uses the bridge FIFO 132. More particularly, the first reverse parallel loopback path follows the n-bit wide (parallel) data path going from the Receiver PMA 104, to the Link Assist Ctrl and Diag Ref Verifier module 130, to the bridge FIFO 132, to the Diag Ref Gen and Tuning SM module 110, to the MUX Select 106, to the Transmitter PMA 102.

In an exemplary implementation, the first reverse parallel loopback path may be used in the use case where both the Target Device and the Partner Device include a link assist controller (i.e. are link-assist-enabled). An exemplary method of using the first reverse parallel loopback path for tuning a link is described below in relation to FIG. 4.

A second reverse parallel loopback path uses the PCS modules (128 and 108) and the rate-match FIFOs (129 and 109 in FIG. 1). In particular, the second reverse parallel loopback path follows the n-bit wide (parallel) data path going from the Receiver PMA 104, to the Receiver PCS 128, to the Hard FIFO 129 in FIG. 1 (or the Hard FIFO 129 and Soft RM FIFO 202 in FIG. 2). The path then follows the N-bit wide (parallel) data path from the Hard FIFO 129 in FIG. 1 (or the Hard FIFO 129 and Soft RM FIFO 202 in FIG. 2) to the Link Assist Ctrl and Diag Ref Verifier module 130, to the Diag Ref Gen and Tuning SM module 110, to the selector 111, to the Hard FIFO 109. Finally, the path follows the n-bit wide (parallel) data path going from the Hard FIFO 109, to the Transmitter PCS 108, to the MUX Select 106, to the Transmitter PMA 102.

In an exemplary implementation, the second reverse parallel loopback path may be used even when the Partner Device does not include a link assist controller (i.e. is not link-assist-enabled). For example, the Partner Device may include a software stack that is programmed to utilize the Link Assist Engine in the Target Device. In this way, the Link Assist Engine provides for link diagnostic, tuning and verification to be done with a variety of third party devices. An exemplary method of using the second reverse parallel loopback path for tuning a link is described below in relation to FIG. 5.

In contrast to the reverse parallel loopback paths described above, a reverse serial loopback path follows the serial data path from the rx_serial_data port, to the CDR, to the tx_serial_port. Using a reverse serial loopback path is disadvantageous for BER testing due to the losses in the physical medium in both directions, particularly in a high loss medium, such as a backplane.

Note that, in a normal operating mode, in which the Link Assist Engine is not used, the data select 111 may select the N-bit data input from the IC Core 170 to be provided via the Hard FIFO 109 to the Transmitter PCS 108. In addition, the MUX select 106 may select the n-bit data signal from the transmitter PCS 108. This n-bit data signal is provided to the Transmitter PMA 102 for transmission to the Partner Device 190. Meanwhile, the Receiver PCS 128 may receive the n-bit data signal from the Receiver PMA 104, and the N-bit data signal may be provided via the Hard FIFO 129 in FIG. 1 (or the Hard FIFO 129 and the Soft RM FIFO 202 in FIG. 2) to the IC Core 170.

Figure 3:
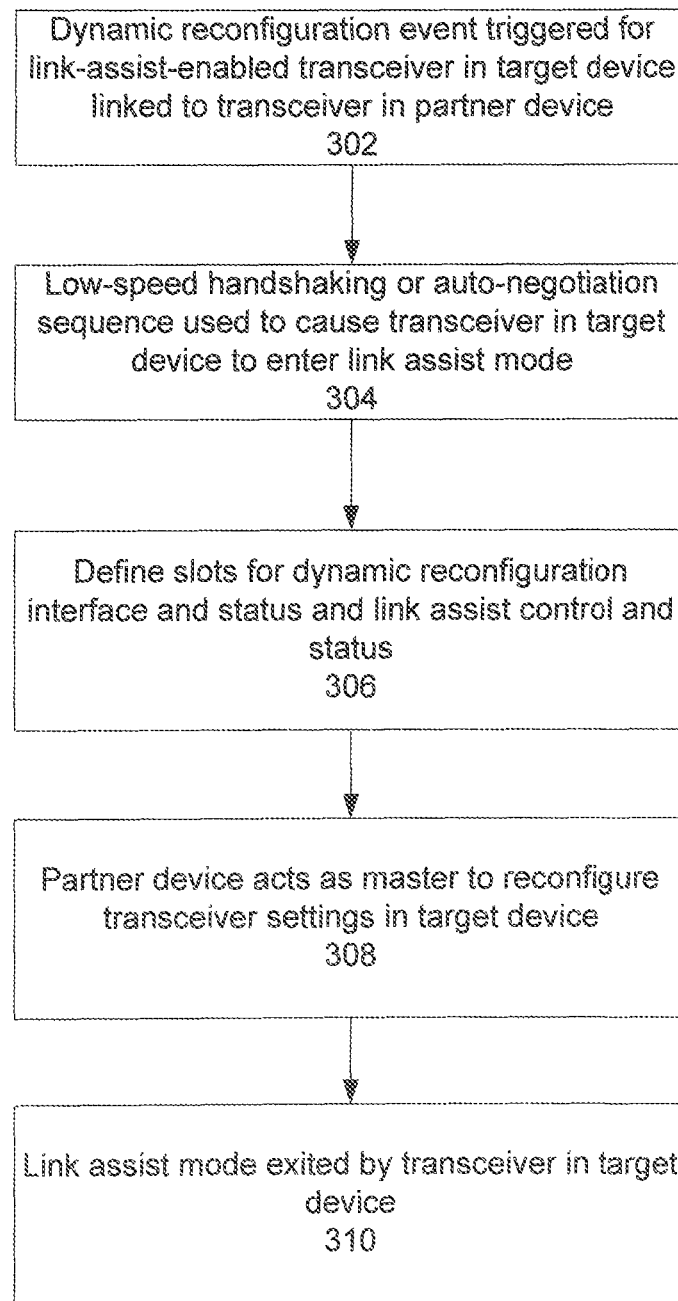
FIG. 3 is a flow chart of a method of dynamic reconfiguration via a HSSI link partner in accordance with an embodiment of the invention.

FIG. 3 is a flow chart of a method 300 of dynamic reconfiguration via a HSSI link partner in accordance with an embodiment of the invention. The method 300 may be performed using the apparatus described above in relation to FIGS. 1 and 2.

Per step 302, the dynamic reconfiguration event may be triggered for a link-assist-enabled transceiver in a target device (e.g., the Target Device 100) that is linked to a transceiver in a partner device (e.g., the Partner Device 190). In an exemplary implementation, the event may be triggered by either the target device or the partner device. For example, the triggering may occur upon power-up, reset, after channel or PLL reconfiguration, and/or in a link fault situation.

Per step 304, once the dynamic reconfiguration event is triggered, low-speed handshaking or an auto-negotiating sequence may be used between the master controller (implemented in a software stack or with a link assist controller) for the transceiver in the partner device and the link assist (slave) controller for the transceiver in the target device to cause the transceiver in the target device to enter a link assist mode. For example, if the link operates at a data rate of X, then the handshaking may be run at a lower data rate of X/2, X/4 or X/8.

Per step 306, slots within the low-speed handshaking frame are defined. The slots are used for communicating dynamic reconfiguration interface commands and status data. The slots are also used to communicate link assist control commands and status data.

Per step 308, the master controller in the partner device dynamically reconfigures transceiver settings for the transceiver in the target device. The reconfigured settings may include transmitter and/or receiver settings and may also include settings for link assist functions.

In an exemplary implementation, the dynamic reconfiguration may be performed using a software stack at the partner device programmed to act as a master controller that controls the link assist (slave) controller for the transceiver in the target device. The master controller may transmit read, write, and/or read-modify-write commands to perform the dynamic reconfiguration of the settings of the transceiver in the target device.

Reconfiguration commands may be received from the master controller and performed by the link assist (slave) controller for the transceiver in the target device. In one implementation, the link assist controller may use a memory-mapped (MM) interface decoder to access and reconfigure DPRIO blocks and soft CSRs on the target device.

The link assist controller may also use the interface decoder as an interface to a bridge to a reconfiguration network. The reconfiguration network may connect with external tools, such as, for example, a design compilation tool or a user-defined program executing on an embedded or external processor. The MM interface decoder may translate commands from the link assist controller to an appropriate command format for an external tool. Command formats may include, for example, register transfer level (RTL) descriptions, JTAG programming, ARM instructions, NIOS instructions, or other command formats. In an exemplary use case, a compiled design may be provided by a design compilation tool to the link assist controller for use in the dynamic reconfiguration.

Per step 310, after successful completion of the reconfiguration, the master controller may cause the transceiver of the target device to exit the link assist mode. Upon exiting link assist mode, the transceiver may re-enter a normal operation mode.

Figure 4:
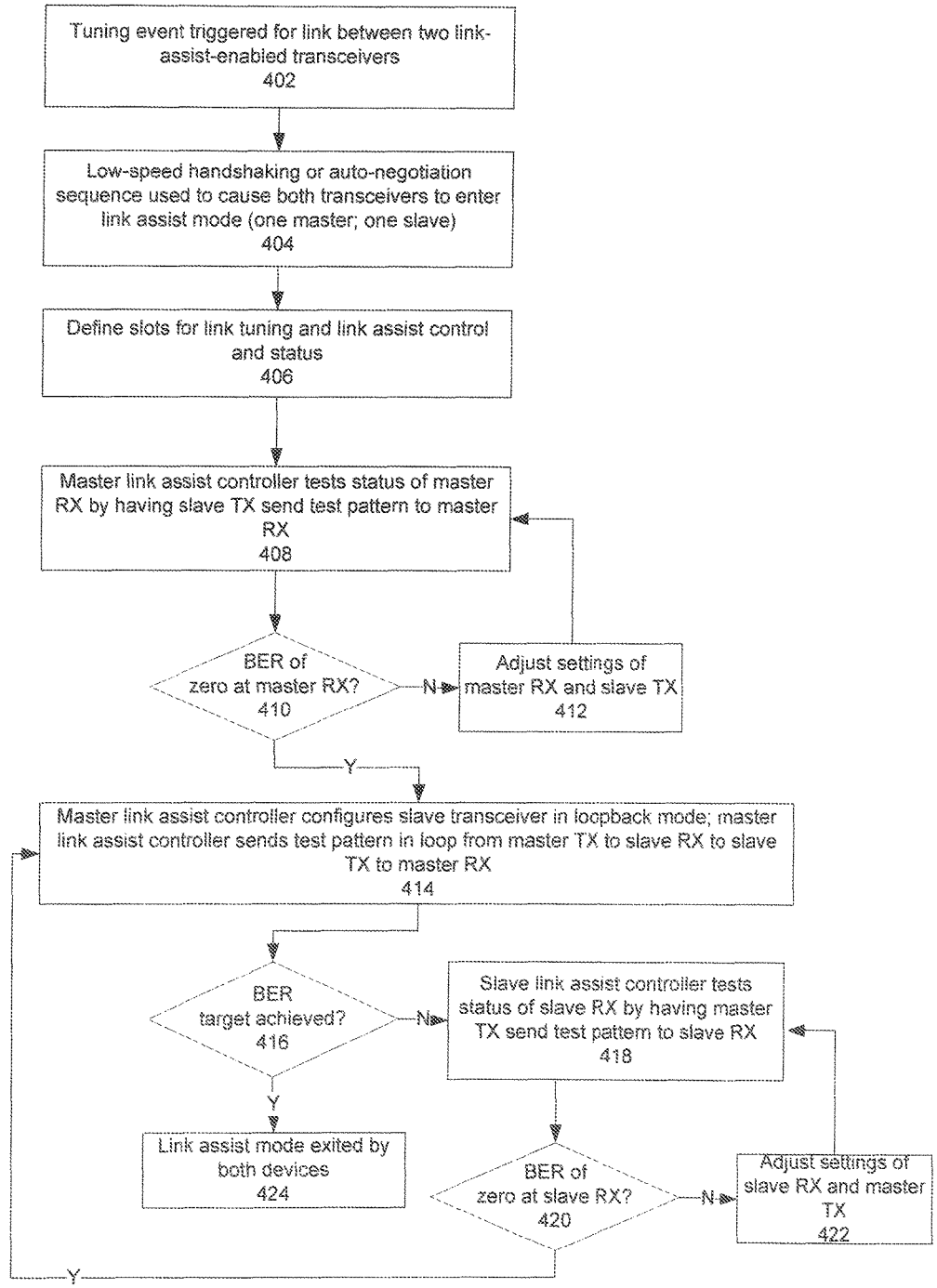
FIG. 4 is a flow chart of a method of adaptive HSSI link tuning in accordance with an embodiment of the invention.

FIG. 4 is a flow chart of a method 400 of adaptive HSSI link tuning in accordance with an embodiment of the invention. In an exemplary implementation, the method 400 may be performed for a bidirectional link between two link-assist-enabled devices.

Per step 402, the tuning event may be triggered for the link between two link-assist-enabled devices. In an exemplary implementation, the tuning event may be triggered by either device. For example, the triggering may occur upon power-up, reset, after channel or PLL reconfiguration, and/or upon occurrence of a link fault.

Per step 404, low-speed handshaking or auto-negotiation sequence may be performed, after which the transceivers in both devices are in link assist mode. In this case, the link assist controller for the transceiver in the target device is designated as the slave controller, and the link assist controller for the transceiver in the partner device is designated as the master controller.

Per step 406, slots within the low-speed handshaking frame are defined. These slots provide means for communicating link tuning interface and status and also link assist control and status.

Per step 408, the master link assist controller tests status of the master receiver (RX). This involves sending commands to the slave link assist controller so that it sends a test pattern from the slave transmitter (TX) to the master RX.

Per step 410, a determination is made as to whether the bit error rate (BER) at the master RX is zero. If the BER as determined by the data recovered by the master RX is not zero, then the method 400 goes to step 412.

Per step 412, the settings of the master RX and the slave TX are adjusted. This involves the master link assist controller sending a command or commands to the slave link assist controller. Thereafter, the method 400 loops back to step 408 to re-test the status of the master RX.

On the other hand, if the BER (as determined by the data recovered by the master RX) is zero, then the connection from the slave TX to the master RX may be deemed to be properly configured. As such, the method 400 may move forward to step 414.

Per step 414, the master link assist controller configures the slave device to be in a loopback mode and performs a round-trip test of the link by causing a test pattern to be sent from the master TX to the slave RX and looped back from the slave TX to the master RX. In exemplary implementation, the loop back may follow the first reverse parallel loopback path described above.

Per step 416, a determination is made as to whether the BER for the round-trip test achieves a targeted BER (i.e. is lower than the targeted BER). The targeted BER may be an acceptably low threshold BER. If the BER as determined by the data recovered by the master RX is not lower than the targeted rate, then the method 400 goes to step 418.

Per step 418, after the slave transceiver exits loopback mode, the master link assist controller tests the status of the slave receiver (RX). This involves sending a test pattern from the master TX to the slave RX.

Per step 420, a determination is made as to whether the BER at the slave RX is zero. If the BER as determined by the data recovered by the slave RX is not zero, then the method 400 goes to step 422.

Per step 422, the settings of the slave RX and the master TX are adjusted. Adjusting the settings of the slave RX involves the master link assist controller sending a command or commands to the slave link assist controller. Thereafter, the method 400 loops back to step 418 to re-test the status of the slave RX.

On the other hand, if the BER (as determined by the data recovered by the slave RX) is zero, then the connection from the master TX to the slave RX may be deemed to be properly configured. As such, the method 400 may loop back to step 414 to redo the round-trip test.

Once the BER for the round-trip test achieves a targeted BER in step 416, then the link configuration may be deemed to be verified. Hence, the method may perform step 424. Per step 424, the master link assist controller may cause the transceivers of both devices to exit the link assist mode. Upon exiting link assist mode, the transceivers may re-enter a normal operation mode.

Note that the test patterns used in the method 400 may be the same test pattern, or they may be different test patterns.

Figure 5:
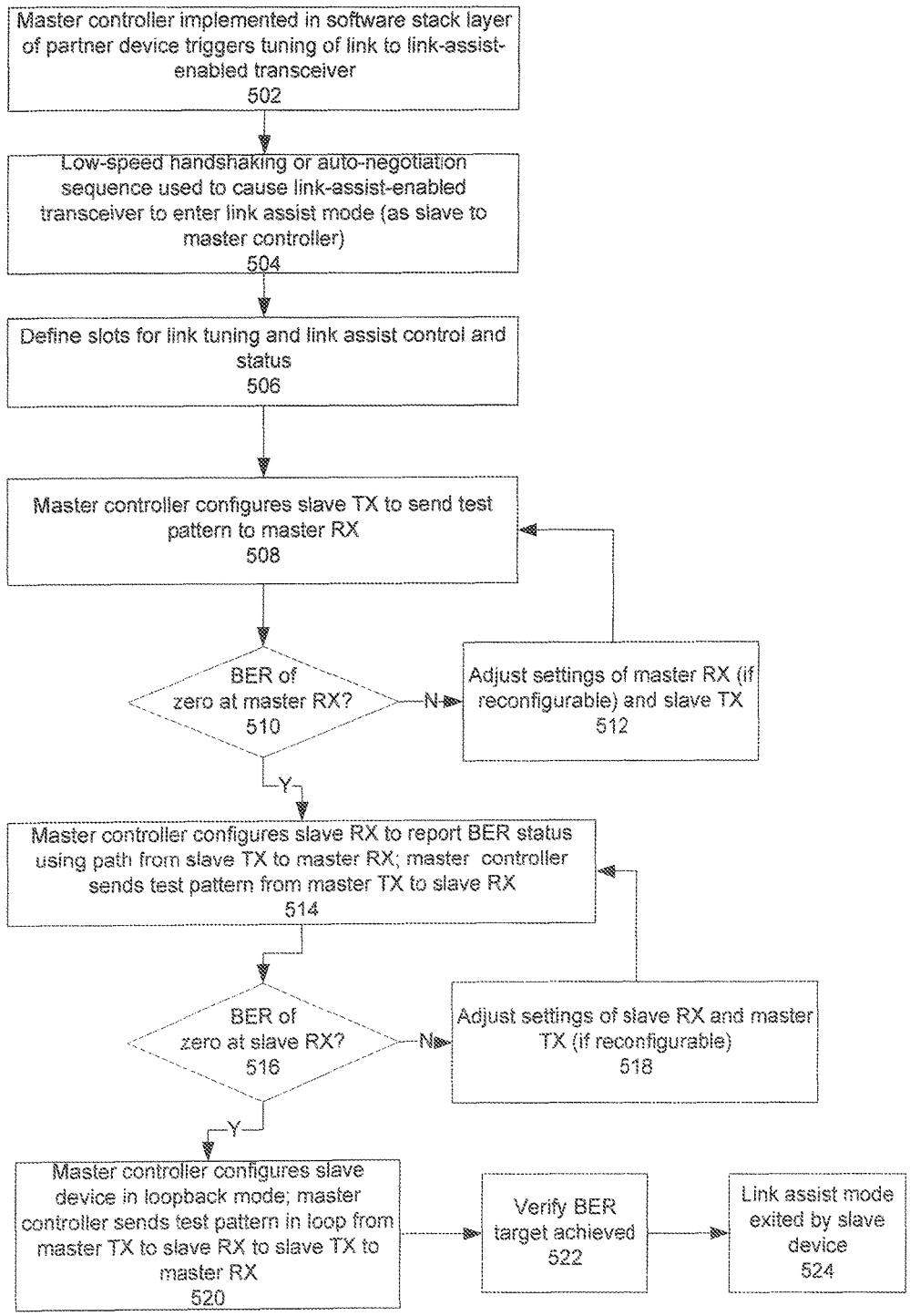
FIG. 5 is a flow chart of a method of adaptive HSSI link tuning in accordance with another embodiment of the invention.

FIG. 5 is a flow chart of a method of adaptive HSSI link tuning in accordance with another embodiment of the invention. In an exemplary implementation, the method 500 may be performed for a bidirectional link between a transceiver in a "partner" device and a link-assist-enabled transceiver in a "target" device. For example, the triggering may occur upon power-up, reset, after channel or PLL reconfiguration, and/or upon occurrence of a link fault.

Per step 502, the tuning event may be triggered for the link between the transceiver in the partner device and a link-assist-enabled transceiver in the target device. In an exemplary implementation, the tuning event may be triggered by a master controller programmed into a software stack layer for the transceiver in the partner device.

Per step 504, low-speed handshaking or auto-negotiation sequence may be used to cause the link assist controller for the transceiver of the target device to enter link assist mode as a slave device. In this case, the link assist controller for the transceiver in the target device is designated as the slave controller to the master controller for the transceiver in the partner device.

Per step 506, slots within the low-speed handshaking frame are defined. These slots provide means for communicating link tuning interface and status and also link assist control and status.

Per step 508, the master controller tests the status of the master receiver (RX). This step may involve configuring the slave link assist controller so that it sends a test pattern from the slave transmitter (TX) to the master RX.

Per step 510, a determination is made as to whether the bit error rate (BER) at the master RX is zero. If the BER as determined by the data recovered by the master RX is not zero, then the method 500 goes to step 512.

Per step 512, the settings of the master RX and the slave TX are adjusted. This involves the master controller sending a command or commands to the slave link assist controller. Thereafter, the method 500 loops back to step 508 to re-test the status of the master RX.

On the other hand, if the BER (as determined by the data recovered by the master RX) is zero, then the connection from the slave TX to the master RX may be deemed to be properly configured. As such, the method 500 may move forward to step 514.

Per step 514, the master controller tests status of the slave receiver (RX). This involves the master controller configuring the slave RX to report BER status using a path from the slave TX to the master RX, and the master controller sending a test pattern from the master TX to the slave RX.

Per step 516, a determination is made as to whether the BER at the slave RX is zero. If the BER (as determined by the data recovered by the slave RX) is not zero, then the method 500 goes to step 518.

Per step 518, the settings of the slave RX and the master TX are adjusted. Adjusting the settings of the slave RX involves the master controller sending a command or commands to the slave link assist controller. Thereafter, the method 500 loops back to step 514 to re-test the status of the slave RX.

On the other hand, if the BER (as determined by the data recovered by the slave RX) is zero, then the connection from the master TX to the slave RX may be deemed to be properly configured. As such, the method 500 may go forward to step 520.

Per step 520, the master controller configures the slave device to be in a loopback mode and performs a round-trip test of the link by causing a test pattern to be sent from the master TX to the slave RX and looped back from the slave TX to the master RX. In exemplary implementation, the loop back may follow the second reverse parallel loopback path described above.

Per step 522, achievement of the target BER (i.e. measured BER is lower than target BER) may be verified by comparing the recovered data from the master RX with the data that was originally sent. Upon verification of the achievement of the target BER, the method 500 may perform step 524. Per step 524, the master controller may use a handshaking procedure to cause the transceiver in the target device to exit the link assist mode.

Note that the test patterns used in the method 500 may be the same test pattern, or they may be different test patterns.

Figure 6:
FIG. 6 is a diagram depicting an array of transceivers that may be dynamically reconfigured and/or have its link adaptively tuned in accordance with an embodiment of the invention.

FIG. 6 is a diagram depicting an array of transceivers (1, 2, . . . , n) that may each be dynamically reconfigured and/or have its link adaptively tuned in accordance with an embodiment of the invention. The array of transceivers may be part of an integrated circuit (IC) device. As shown, each of the transceivers in the array may be link-assist enabled (i.e. having a Link Assist engine). Note, however, that all the transceivers of an IC device need not necessarily be link-assist enabled. In other words, some of the transceivers may be link-assist enabled, while others may not be.

As further shown, each of the transceivers in the array may be active. In other words, each transceiver may be actively operating a high-speed serial interface (HSSI) link to a link partner (HSSI link partner). The link partners are transceivers that may be on one or more partner devices.

As described herein, an active transceiver may enter a link assist mode via its link partner. In one exemplary use, the link assist mode may be utilized for dynamic reconfiguration of the active transceiver. The reconfiguration is dynamic in that the target device may continue operating (and does not need to be reconfigured) in order to reconfigure a transceiver in the array. In another exemplary use, the link assist mode may also be utilized to adaptively tune the HSSI link between the active transceiver and its link partner.

As further shown in FIG. 6, the Link Assist engines may interact with a reconfiguration network via a memory-mapped (MM) interface decoder to a MM interface bridge. The reconfiguration network may include one or more tools, such as a design compilation tool and a user-defined program executing on an external processor.

Figure 7:
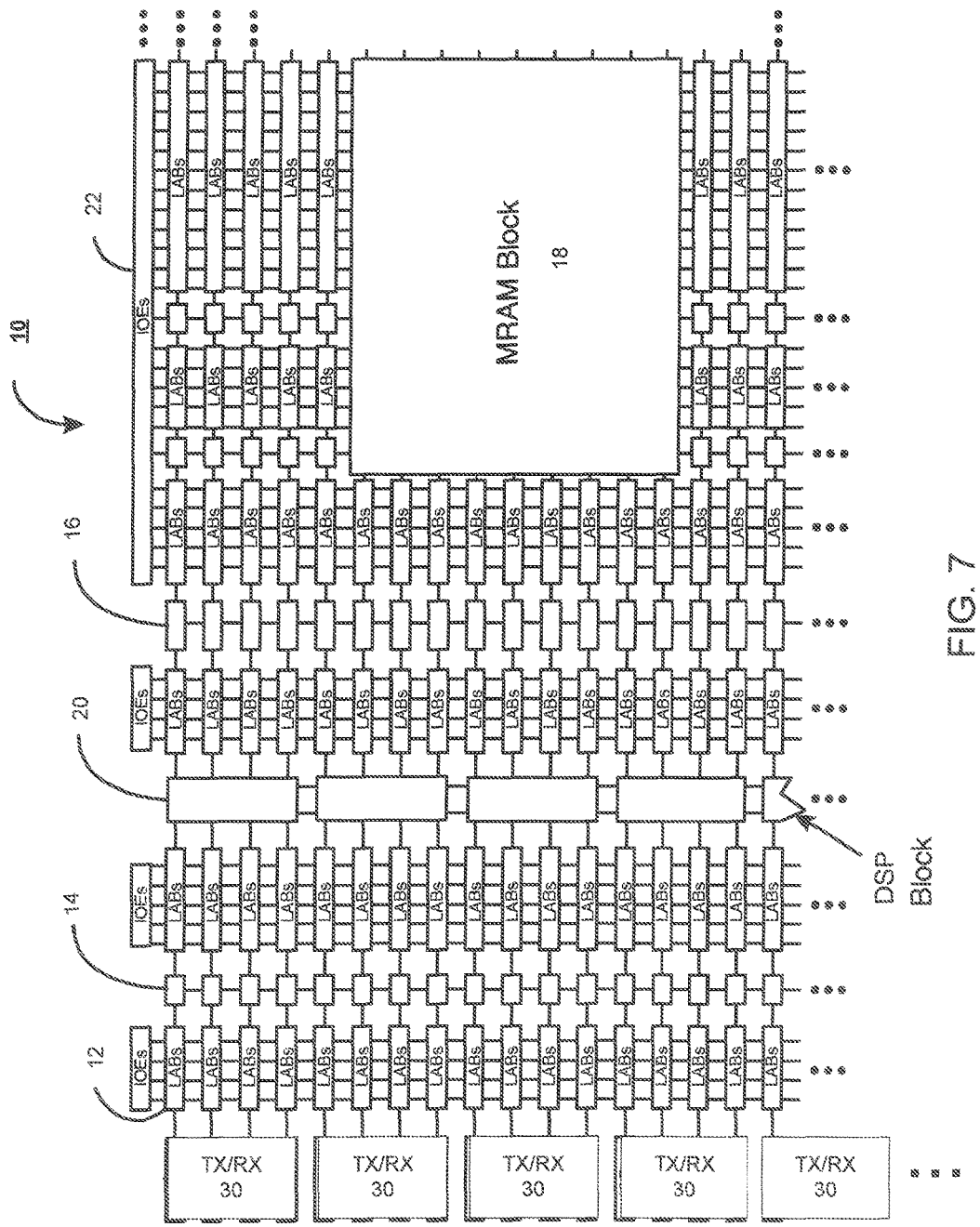
FIG. 7 is a simplified partial block diagram of a field programmable gate array that may be arranged or configured to include one or more of the circuits disclosed herein in accordance with an embodiment of the invention.

FIG. 7 is a simplified partial block diagram of a field programmable gate array (FPGA) 10 that may be arranged or configured to include one or more of the circuits disclosed herein in accordance with an embodiment of the invention. It should be understood that embodiments of the present invention may be used in numerous types of integrated circuits, including FPGAs, programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers. FPGA 10 may further include digital signal processing (DSP) blocks 20 that can implement, for example, multipliers with add or subtract features.

Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the transmitter and receiver circuitry described herein.

It is to be understood that FPGA 10 is described herein for illustrative purposes only and that the present invention can be implemented in many different types of PLDs, FPGAs, and ASICs.

Figure 8:
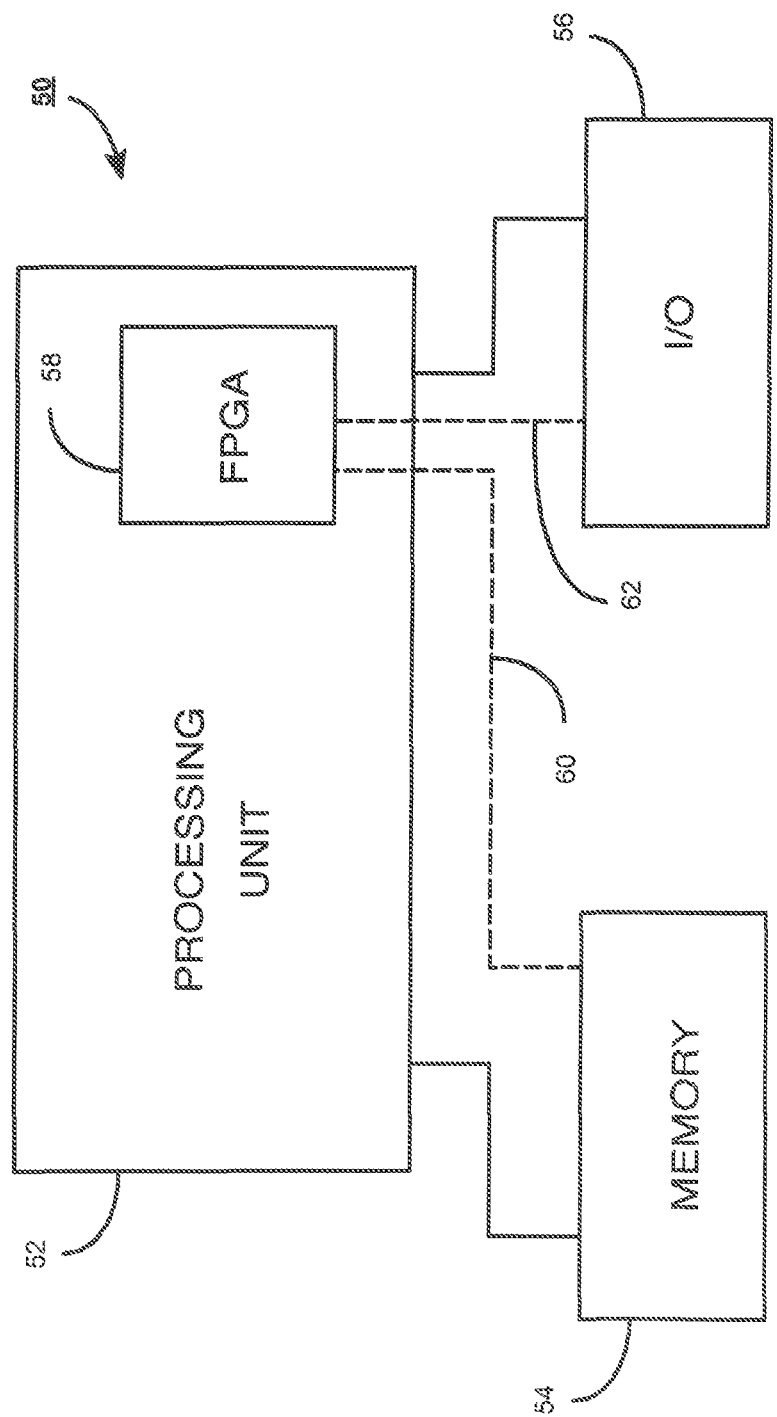
FIG. 8 is a block diagram of an exemplary digital system that may employ an embodiment of the invention.

FIG. 8 is a block diagram of an exemplary digital system 50 that may employ an embodiment of the invention. As shown, system 50 may include an FPGA as one of several components.

System 50 may be, for example, a programmed digital computer system, digital signal processing system, specialized digital switching network, or other processing system. System 50 may be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

As shown, system 50 includes a processing unit 52, a memory unit 54, and an input/output (I/O) unit 56 interconnected together by one or more buses. According to this exemplary embodiment, FPGA 58 is embedded in processing unit 52. FPGA 58 may serve many different purposes within the system 50. FPGA 58 may, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of managing transceiver settings for a target transceiver in a target device, the method comprising:
   entering a link assist mode by a link assist controller of the target transceiver such that the link assist controller is a slave to a master controller of a partner transceiver;
   receiving commands from the master controller by the link assist controller;
   using the commands to reconfigure the transceiver settings of the target transceiver; and
   exiting the link assist mode by the link assist controller such that the target transceiver enters a normal operating mode.

2. The method of claim 1, wherein slots in a handshaking frame are used to communicate the commands and status data between the link assist controller and the master controller to perform the reconfiguration of the target transceiver.

3. The method of claim 1, further comprising:
   using a memory-mapped interface decoder to access and reconfigure dynamic partial reconfiguration input-output blocks and soft configuration and status registers on the target device.

4. The method of claim 1, further comprising:
   using a memory-mapped interface decoder to connect to a reconfiguration network.

5. The method of claim 4, wherein the reconfiguration network provides access to a design compilation tool.

6. The method of claim 1 further comprising tuning a bidirectional serial link between the target transceiver in the target device and the partner transceiver in a partner device by:
   entering the link assist mode by the link assist controller of the target transceiver such that the link assist controller is a slave to the master controller of the partner transceiver; and
   separately testing both directions of the link and also testing a round-trip path over the link.

7. The method of claim 6, wherein the target transceiver comprises a target transmitter and a target receiver, and the partner transceiver comprises a partner transmitter and a partner receiver, the method further comprising:
   sending commands from the master controller to the link assist controller to cause the target transmitter to send a first test pattern to the partner receiver;
   determining a first bit error rate by comparing data received by the partner receiver against the first test pattern; and
   adjusting settings for the partner receiver and/or the target transmitter if the first bit error rate is not zero.

8. The method of claim 7, further comprising:
   sending a second test pattern from the partner transmitter to the target receiver;
   determining a second bit error rate by comparing data received by the target receiver against the second test pattern; and
   adjusting settings for the target receiver and/or the partner transmitter if the second bit error rate is not zero.

9. The method of claim 8, further comprising:
   sending commands from the master controller to the link assist controller to configure the target transceiver in loopback mode;
   sending a third test pattern in a loop from the partner transmitter to the target receiver to the target transmitter to the partner receiver;
   determining a third bit error rate by comparing data received by the partner receiver against the third test pattern.

10. The method of claim 9, further comprising:
exiting the link assist mode by the target transceiver if the third bit error rate is below a target bit error rate.

11. The method of claim 6, wherein the master controller comprises the link assist controller in the partner transceiver.

12. The method of claim 6, wherein the master controller is implemented in a software stack for the partner transceiver.

13. The method of claim 6, wherein entering the link assist mode is effectuated in response to performing handshaking between the master controller of the partner transceiver and the link assist controller of the target transceiver.

14. The method of claim 1, wherein entering the link assist mode is effectuated in response to performing handshaking between the master controller of the partner transceiver and the link assist controller of the target transceiver.

15. The method of claim 1 further comprising sending the commands from the master controller to the link assist controller to reconfigure the transceiver settings of the target transceiver.

\* \* \* \* \*